(12) United States Patent
Wu et al.

(10) Patent No.: US 7,158,697 B2
(45) Date of Patent: *Jan. 2, 2007

(54) OPTICAL MULTIPLEXER AND DEMULTIPLEXER APPARATUS UTILIZING MULTIPLE POLARIZATION BEAM SPLITTERS AND REFLECTION INTERFEROMETERS

(75) Inventors: Xuehua Wu, Union City, CA (US); YueZhong Feng, Union City, CA (US); Xixiang Chen, Oakland, CA (US); Giovanni Barbarossa, Saratoga, CA (US); Simon X. F. Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/425,068

(22) Filed: Apr. 28, 2003

(65) Prior Publication Data

US 2004/0151425 A1 Aug. 5, 2004

Related U.S. Application Data

(60) Provisional application No. 60/376,678, filed on Apr. 29, 2002.

(51) Int. Cl.
*G02B 6/26* (2006.01)
(52) U.S. Cl. .............................. 385/24; 385/15; 385/37

(58) Field of Classification Search ................... 385/24
See application file for complete search history.

(56) References Cited

U.S. PATENT DOCUMENTS

| 6,130,971 | A | 10/2000 | Cao | ............................. 385/31 |
| 6,169,604 | B1 | 1/2001 | Cao | ............................. 356/519 |
| 6,169,828 | B1 | 1/2001 | Cao | ............................. 385/31 |
| 6,205,270 | B1 | 3/2001 | Cao | ............................. 385/24 |
| 6,263,129 | B1 | 7/2001 | Cao | ............................. 385/24 |
| 6,310,690 | B1 | 10/2001 | Cao et al. | ................... 356/519 |
| 6,396,629 | B1 | 5/2002 | Cao | ............................. 359/484 |
| 6,683,721 | B1 * | 1/2004 | Copner et al. | ............... 359/618 |
| 2002/0122614 | A1 * | 9/2002 | Zhou et al. | ................... 385/15 |
| 2003/0007157 | A1 * | 1/2003 | Hulse et al. | ................. 356/491 |

* cited by examiner

*Primary Examiner*—Nikita Wells
*Assistant Examiner*—Phillip A. Johnston
(74) *Attorney, Agent, or Firm*—Patterson & Sheridan, LLP

(57) ABSTRACT

An optical apparatus functioning either as a multiplexer or a demultiplexer, including: a first polarization beam splitter (PBS); a second PBS optically coupled to the first PBS along an axis of the apparatus; a half-wave plate optically coupled between the first and second PBS; a common optical port optically coupled to the first PBS at a face intersecting the axis; a first non-common optical port optically coupled to the first PBS at a face not intersecting the axis; a second non-common optical port optically coupled to the second PBS; and a reflection interferometer optically coupled to the second PBS. The apparatus provides the benefits of using the reflection interferometer, but does not require paired reflection interferometers or Faraday rotators.

22 Claims, 10 Drawing Sheets

OPTICAL MULTIPLEXER AND DEMULTIPLEXER APPARATUS UTILIZING MULTIPLE POLARIZATION BEAM SPLITTERS AND REFLECTION INTERFEROMETERS

CROSS-REFERENCE TO RELATED APPLICATIONS

This application claims priority to Provisional U.S. Patent Application Ser. No. 60/376,678 entitled "Optical Multiplexer and Demultiplexer Apparatus Utilizing Multiple Polarization Beam Splitters and Reflection Interferometers," filed on Apr. 29, 2002.

FIELD OF THE INVENTION

The present invention relates to fiber optic networks, and more particularly to wavelength division multiplexers and wavelength division de-multiplexers utilized in fiber optic networks carrying wavelength division multiplexed information signals.

BACKGROUND OF THE INVENTION

Fiber optic communication systems are becoming increasingly popular for data transmission due to their high speed and high data capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber. Strictly speaking, a multiplexer is an apparatus that combines separate channels into a single wavelength division multiplexed composite optical signal and a de-multiplexer is an apparatus that separates a composite optical signal into its component channels. However, many multiplexers and de-multiplexers ordinarily operate in either sense, simply by reversing the direction of light propagation.

In this document, the individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal." Although each information-carrying channel actually comprises light of a certain respective range of physical wavelengths, for simplicity, a single channel is referred to as a single wavelength, $\lambda$, and a plurality of n such channels are referred to as "n wavelengths" denoted $\lambda_1$–$\lambda_n$.

To distinguish amongst the various optical ports, the optical port from which a de-multiplexer receives channels or to which a multiplexer outputs channels is referred to in this document as a "common" port. Also, the optical ports to which a de-multiplexer outputs channels or from which a multiplexer receives channels are referred to as "non-common" ports.

A crucial feature of fiber optic networks is the separation of the composite optical signal into its component wavelengths or channels, typically by a wavelength division de-multiplexer. This separation must occur to allow for the exchange of signals between loops within optical communications networks. The exchange typically occurs at connector points, or points where two or more loops intersect for the purpose of exchanging wavelengths.

Conventional methods utilized by wavelength division de-multiplexers in separating a composite optical signal into its component channels include the use of filters and fiber gratings as separators. A "separator" or "channel separator", as used in this specification, is an integrated collection of optical components functioning as a unit which separates one or more channels of a composite optical signal from one another. Filters allow a target channel to pass through while redirecting all other channels. Fiber gratings target a channel to be reflected while all other channels pass through. Both filters and fiber gratings are well known in the art and will not be discussed in further detail here.

A problem with the conventional separators is the precision required of a transmitter device—that is, a light emitting device which generates an optical signal at a particular wavelength—because of the narrow pass bands of such separators. This high precision is difficult to accomplish. To overcome this shortcoming, related-art channel separators utilizing a polarization beam splitter and a paired reflection interferometers have been disclosed. These related-art reflection interferometers and channel separators, which have a greater ease of alignment and tolerance for wavelength offset than conventional separators, are disclosed in the following U.S. Pat. Nos. 6,130,971; 6,169,604; 6,169,828; 6,263,129; and 6,310,690. Channel separators utilizing polarization beam splitters, reflection interferometers and Faraday rotators are disclosed in a co-pending U.S. patent application titled "Multi-Functional Optical Device Utilizing Multiple Polarization Beam Splitters and Non-Linear Interferometers" Ser. No. 09/630,891, filed Aug. 2, 2000 and in U.S. Pat. No. 6,396,629. A related-art optical comb filter that utilizes a reflection interferometer is disclosed in U.S. Pat. No. 6,205,270. All of the aforementioned patents and patent applications are assigned to the assignee of the present invention and incorporated herein in their entirety by reference.

Through use of a reflection interferometer, the above-referenced related-art separators have advantages over conventional separators in terms of increased widths of the pass bands and isolation bands and greater ease of alignment of transmitters to the pass bands. However, some of these related-art channel separators utilize two independent reflection interferometers, which must be matched to one another, both position-wise and with respect to their optical characteristics. Others of these related-art channel separators utilize Faraday rotators and unpaired reflection interferometers. The relaxation of the requirement for paired interferometers within these other channel separators simplifies mechanical alignment but the incorporation of Faraday rotators causes an optical isolation effect, which prevents a single such apparatus from being used both as a multiplexer and a de-multiplexer. Therefore, there exists a need for a separation mechanism that possesses the above-mentioned benefits of the reflection interferometer, but does not require paired reflection interferometers or Faraday rotators. The present invention addresses such a need.

SUMMARY OF THE INVENTION

To address the above-discussed need, the present invention discloses an apparatus that may be utilized bi-directionally as either an interleaving de-multiplexer or as an interleaving multiplexer in wavelength division multiplexed optical communication systems. In operation as a de-multiplexer (DEMUX), an apparatus in accordance with the present invention receives, through a "common" port, a wavelength division multiplexed composite optical signal comprising a plurality of optical channels and separates the composite optical signal into at least two subsets of channels, wherein each subset of channels is output from a respective non-common port and the subsets are interleaved with one another in the original composite optical signal.

In operation as a multiplexer (MUX), an apparatus in accordance with the present invention receives, through each of at least two ports, an input wavelength division multiplexed composite optical signal comprising a plurality of optical channels and combines the at least two wavelength division multiplexed composite optical signals into an output composite optical signal output through the common port, wherein the output composite optical signals are interleaved with one another in the output composite optical signal.

Light passing through a preferred embodiment of an apparatus in accordance with the present invention interacts with at least two reflective interferometers. As a result, the apparatus comprises the functionality of a DEMUX or a MUX coupled in sequence with an optical comb filter. This functionality significantly increases channel isolation of the apparatus.

In a preferred embodiment, an apparatus in accordance present invention comprises a first and a second polarization beam splitter (PBS), a half-wave plate optically coupled between the first and second PBS, a common optical port optically coupled to the first PBS, a first non-common port optically coupled to the first PBS, a second non-common port optically coupled to the second PBS, a first reflection interferometer optically coupled to the second PBS, a second reflection interferometer optically coupled to the second PBS and a third reflection interferometer optically coupled to the first PBS. Each of the ports the common port and the two non-common ports—comprises a collimator, a birefringent walk-off plate and a non-reciprocal optical rotator.

DETAILED DESCRIPTION

The present invention provides an apparatus that may be utilized bi-directionally as either an interleaving de-multiplexer or as an interleaving multiplexer in wavelength division multiplexed optical communication systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more fully appreciate and understand the features and advantages of the present invention, please refer to FIGS. 1A–6 in conjunction with the following discussions.

Figure 1A:
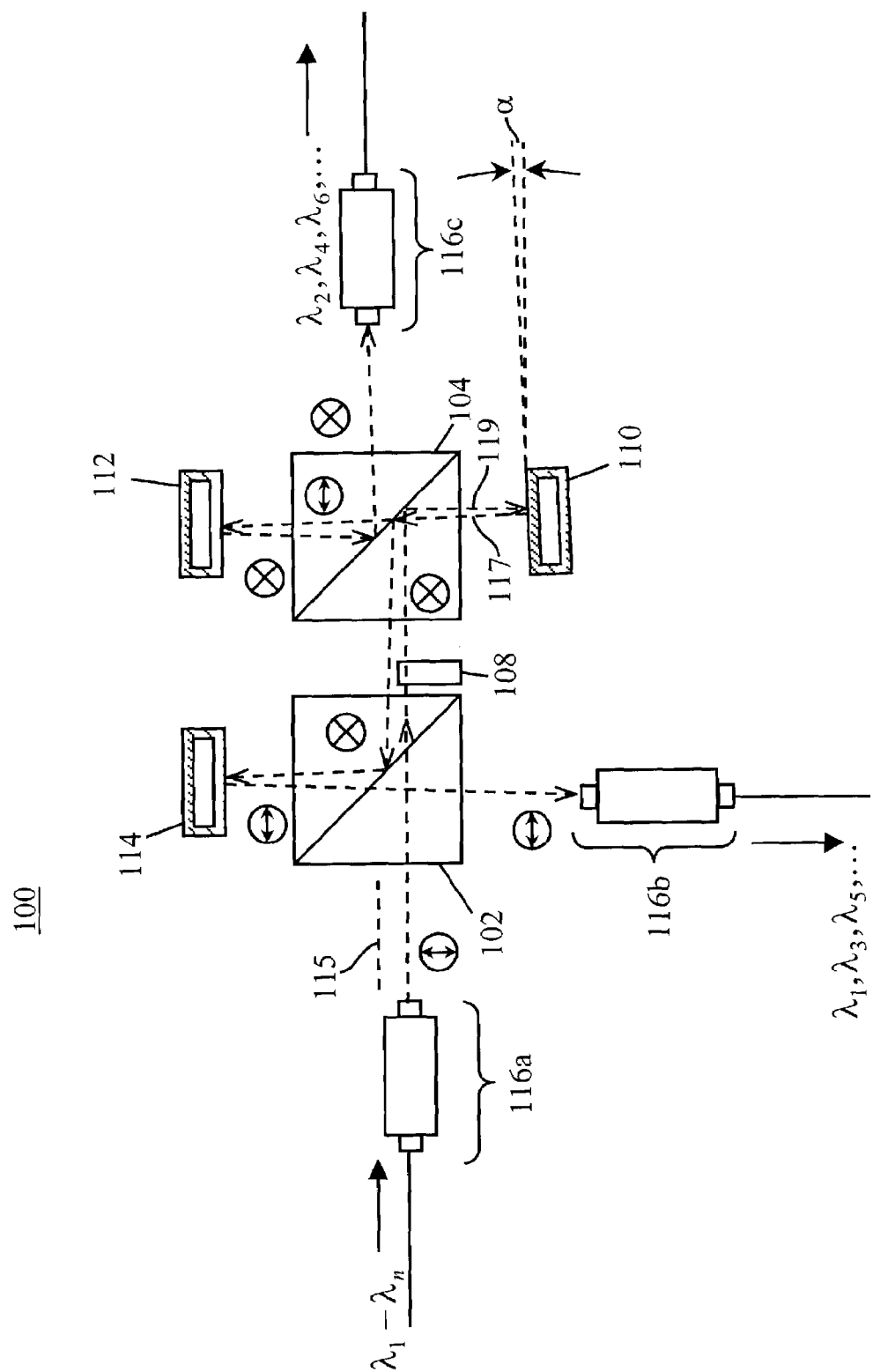
FIG. 1A is a side view of a first preferred embodiment of an interleaved MUX/DEMUX in accordance with the present invention showing the pathways of odd signal channels therethrough from the common port to the first non-common port and of even channels therethrough from the common port to the second non-common port.
Figure 1B:
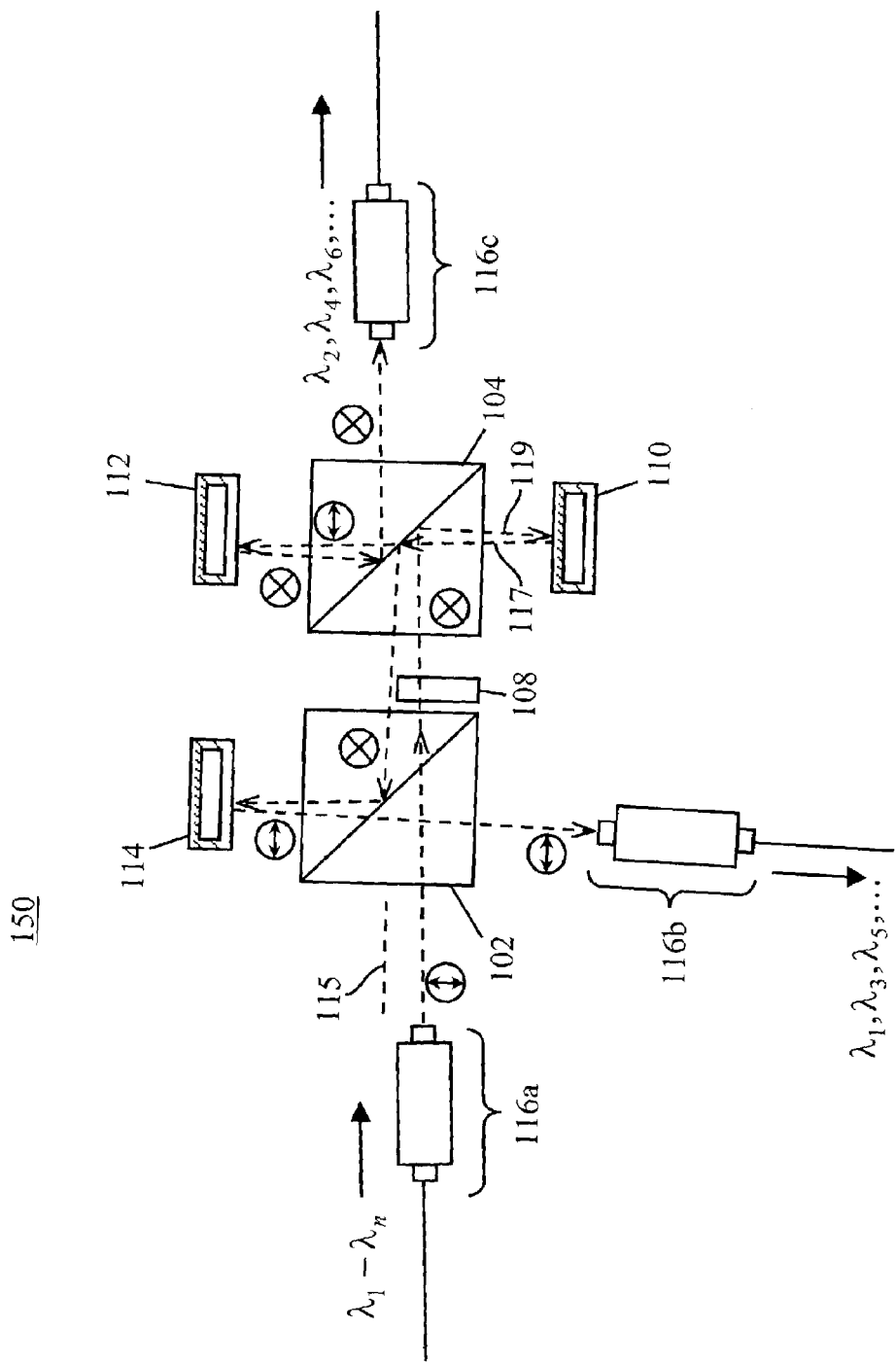
FIG. 1B is a side view of a second preferred embodiment of an interleaved MUX/DEMUX in accordance with the present invention showing the pathways of odd signal channels therethrough from the common port to the first non-common port and of even channels therethrough from the common port to the second non-common port.

FIGS. 1A–1B provide illustrations of two preferred embodiments of an interleaved MUX/DEMUX apparatus in accordance with the present invention. Also indicated in these figures, as well as in the remaining figures of this document, are the polarization orientations of various signal light rays. These polarization orientations are indicated by double barbed arrows and/or crosses inscribed within circles. Unless otherwise indicated, double barbed arrows indicate light polarization along the indicated direction within the plane of the illustration, and crosses indicate light polarization normal to the plane of the page. Superimposed arrows and crosses either indicate non-polarized or randomly polarized light or superimposed rays which, in projection, have mutually perpendicular polarization plane orientations.

As illustrated in both FIGS. 1A–1B, each one of the first preferred embodiment 100 (FIG. 1A) and the second preferred embodiment 150 (FIG. 1B) of the interleaved MUX/DEMUX comprises a first polarization beam splitter (PBS) 102, a second PBS 104, a half-wave plate 108 partially optically coupled between the first 102 and the second 104 PBS, a common optical port 116a optically coupled to the first PBS 102, a first non-common port 116b optically coupled to the first PBS 102, a second non-common port 116c optically coupled to the second PBS 104, a first reflection interferometer 110 optically coupled to the second PBS 104, a second reflection interferometer 112 optically coupled to the second PBS 104 and a third reflection interferometer 114 optically coupled to the first PBS 102.

The half-wave plate 108 is herein referred to as partially optically coupled between the PBS's 102–104 because it occupies only a certain portion of the space between the two PBS's. Therefore, the polarization of linearly polarized light rays is rotated if the light rays pass from one PBS to the other through the half-wave plate 108 but remains unchanged if the light rays pass from one PBS to the other without encountering the half-wave plate 108.

The construction and operation of the reflection interferometers 110–114 are disclosed in the aforementioned U.S. Pat. Nos. 6,130,971; 6,169,604; 6,169,828; 6,263,129 and 6,310,690. Each of these reflection interferometers has the property of reflecting all linearly polarized light input thereto such that reflected light comprising a first set of channels (e.g., the "odd" channels) that is interleaved with a second set of channels is reflected without any polarization plane rotation whereas the reflected light comprising the second set of channels (e.g., the "even" channels) is reflected with a 90° polarization plane rotation. These interferometers 110, 112, 114 are herein referred to as "reflection" interferometers because they all have the property of producing interference-related optical effects whilst reflecting substantially all the light input thereto. The first reflection interferometer 110 and the second reflection interferometer 112 are configured or adjusted so as to rotate the polarization of the even channels while leaving the polarization of the odd channels unchanged. The third reflection interferometer 114 is configured or adjusted so as to rotate the polarization of the odd channels while leaving the polarization of the even channels unchanged.

FIG. 1A illustrates the pathways of optical channels through the interleaved MUX/DEMUX 100 when this apparatus is utilized as a de-multiplexer. FIG. 1B illustrates the similar pathways of optical channels through the interleaved MUX/DEMUX 150 when that apparatus is utilized as a de-multiplexer. When either the apparatus 100 or the apparatus 150 is utilized as a de-multiplexer, the common port 116a comprises an input port for a set of wavelength division multiplexed optical channels denoted $\lambda_1-\lambda_n$, the first non-common port 116b comprises an output port for odd channels $\lambda_1, \lambda_3, \lambda_5, \ldots$ and the second non-common port 116c comprises an output port for even channels $\lambda_2, \lambda_4, \lambda_6, \ldots$.

In the MUX/DEMUX 100 (FIG. 1A), the collimated light emanating from the common port 116a propagates essentially parallel to an axis 115 of the apparatus 100, which is defined as the extended imaginary line joining the centers of the PBS 102 and the PBS 104. However, in the MUX/DEMUX 150 (FIG. 1B), the port 116a is configured or aligned such that the collimated light emanating from the port 116a propagates at a slight angle to the similarly-defined axis 115 of the apparatus 150.

The collimated light input from the common port 116a of either the MUX/DEMUX 100 (FIG. 1A) or the MUX/DEMUX 150 (FIG. 1B) is p-polarized with respect to the first PBS 102 and passes through the first PBS 102 without deflection or reflection towards and through the half-wave plate 108. Upon passing through the half-wave plate 108, the polarization of the light comprising the channels $\lambda_1-\lambda_n$ is rotated by 90° such that this light becomes s-polarized with respect to the second PBS 104. The light of the channels $\lambda_1-\lambda_n$ is thus reflected by the second PBS 104 to the first reflection interferometer 10.

FIGS. 1A–1B further illustrate the pathways of odd channels $\lambda_1, \lambda_3, \lambda_5, \ldots$ from the first reflection interferometer 110 to the first non-common port 116b and of even channels $\lambda_2, \lambda_4, \lambda_6, \ldots$ from the first reflection interferometer 110 to the second non-common port 116c. Upon interaction with and reflection from the first reflection interferometer 110, the polarization of light comprising the even channels is rotated by 90° whilst the polarization of light comprising the odd channels remains unchanged. Both sets of channels are reflected from the first reflection interferometer 110 to the second PBS 104 but are separated thereat because the odd channels are s-polarized and the even channels are p-polarized with respect to the second PBS 104. The odd channels are thus deflected towards and through the first PBS 102 whilst the even channels pass undeflected through the second PBS 104.

The MUX/DEMUX 100 and the MUX/DEMUX 150 comprise all the same components, but the angular alignment of the components is slightly different from one embodiment to the other. The MUX/DEMUX 150 (FIG. 1B) incorporates "tilting" of at least one of the optical ports to cause left-to-right- and right-to-left-traveling optical channels to propagate at a slight angle to the axis 115 of the device. The MUX/DEMUX 100 (FIG. 1A) incorporates tilting of at least one of the reflection interferometers to accomplish a similar effect. The propagation of channels at a slight angle to the axis 115 causes left-to-right traveling channels to pass through the half-wave plate 108 and right-to-left traveling channels to bypass the half-wave plate 108. In fact, slight angular rotations of not only the collimators and reflection interferometers 110, 112, 114 but also of the PBS's 102, 104 can be utilized to accomplish the same effect within an apparatus in accordance with the present invention. These slight angular rotations may apply to more than one optical component in an apparatus.

Specifically, in the MUX/DEMUX 100 (FIG. 1A), the first reflection interferometer 110 is disposed at a slight angle having an absolute value of of relative to the axis 115. Further, the channels propagating towards the first reflection interferometer 110 within the apparatus 100 travel along a path segment 119 that is substantially perpendicular to the axis 115. Therefore, immediately after reflection from the first reflection interferometer 110, the reflected channels propagate along a path segment 117 that is oriented at an angle having an absolute value of 2α relative to a line perpendicular to the axis 115.

In the MUX/DEMUX 150 (FIG. 1B), the first reflection interferometer 110 is disposed parallel to the axis 115 and the channels propagate towards the first reflection interferometer along a path segment 119 that is disposed at an angle having absolute value of 2α relative to a line perpendicular to the axis 115. The path segment 119 is non-perpendicular to the axis 115 within the apparatus 150 by virtue of the alignment or configuration of the port 116a, such that the light emanating from the port 116a does not propagate parallel to axis 115. By the reflection law, the reflected channels propagate along the path 117 that is also oriented at an angle having an absolute value of 2α relative to a line perpendicular to the axis 115.

The odd channels $\lambda_1, \lambda_3, \lambda_5, \ldots$ are deflected or reflected by the second PBS 104 so as to travel towards the first PBS 102 (FIGS. 1A–1B). However, these odd channels do not pass through the half-wave plate 108 by virtue of the fact that the half-wave plate 108 is only optically coupled between a certain portion of the PBS's 102–104. Since the channels travel non-parallel to the axis 115, they bypass the half-wave plate 108 during passage from the second PBS 104 to the first PBS 102. The odd channels therefore remain s-polarized with respect to the first PBS 102 and are reflected or deflected by the first PBS 102 to the third reflection interferometer 114 (FIGS. 1A–1B). On the other hand, the p-polarized even channels $\lambda_2$, $\lambda_4$, $\lambda_6$, . . . are transmitted through the second PBS 104 to the second reflection interferometer 112 (FIGS. 1A–1B).

Within either the apparatus 100 (FIG. 1A) or the apparatus 150 (FIG. 1B), the second reflection interferometer 112 is adjusted or configured to as to rotate the polarization of light of the even channels while leaving the polarization of light of the odd channels unchanged. Consequently, upon reflection from the second reflection interferometer 112, the polarization of the light of the even channels is rotated yet again so as to become s-polarized with respect to the second PBS 104. These s-polarized even channels are then directed back to the second PBS 104 at which they are reflected or deflected so as to be output at the second non-common port 116c.

The third reflection interferometer 114 in either the apparatus 100 or the apparatus 150 is adjusted or configured so as to rotate the polarization of light of the odd channels while leaving the polarization of light of the even channels unchanged. Consequently, upon reflection from the third reflection interferometer 1114, the polarization of the light of the odd channels becomes p-polarized with respect to the first PBS 102. These p-polarized odd channels then pass through the first PBS 102 undeflected so as to be output at the first non-common port 116b.

Figure 2:
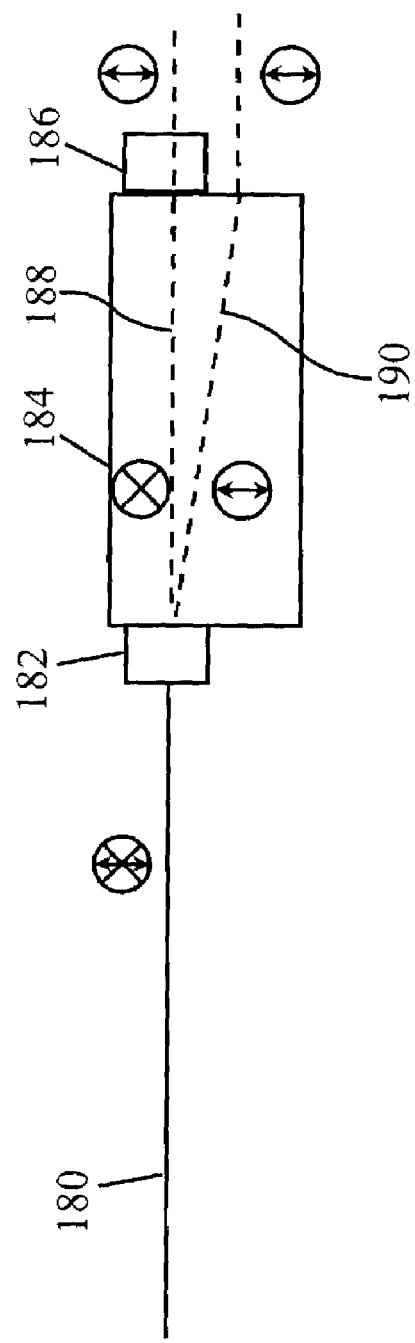
FIG. 2 is an illustration of an optical port assembly for use with an interleaved MUX/DEMUX in accordance with the present invention.

FIG. 2 is an illustration of an optical port assembly 116 as utilized within the interleaved MUX/DEMUX 100 and the interleaved MUX/DEMUX 150. The configuration shown in FIG. 2 represents the construction of all three ports 116a-116c. The port 116 is herein termed a "polarizing port" because the port 116 outputs light comprising only a single linear polarization orientation and can only receive light comprising the same linear polarization orientation. The polarizing port 116 comprises an optical fiber 180, an optical collimator 182, a birefringent walk-off plate 184 and a reciprocal optical rotator 186. Preferably, the reciprocal optical rotator 186 comprises a half-wave plate. The optical collimator 182 is optically coupled to the optical fiber 180 and either receives input from or directs output to the fiber 180. When the optical fiber 180 is utilized to deliver input light, the collimator 182 receives diverging light rays and sets these rays parallel to one another so as to form a collimated light beam. When the optical fiber 180 receives output light, the collimator 182 focuses a beam of collimated light into the end face of the fiber 180.

The birefringent walk-off plate 184 of the polarizing port 116 (FIG. 2) is optically coupled to the collimator 182 at a side opposite to the fiber 180 and has the property of physically separating an unpolarized light beam received from collimator 182 into a deflected light beam 190 and an un-deflected light beam 188. The deflected light 190 comprises an e-ray having a first linear polarization orientation and the un-deflected light 188 comprises an o-ray having a second linear polarization orientation perpendicular to that of the e-ray.

Immediately after passing through the birefringent walk-off plate 184 of the polarizing port 116 (FIG. 2), the two beams 188–190 emerge parallel to one another but have mutually orthogonal polarization orientations. The reciprocal optical rotator 186, which is optically coupled to the birefringent walk-off plate 184 at a side opposite to the collimator 182, is disposed so at to intercept the path of only one of the two beams 188–190. The reciprocal optical rotator 186 rotates the polarization orientation of the intercepted beam by 90° so as to be parallel to that of the other beam. In the reverse light propagation direction, that is, when the polarizing port 116 is utilized as an output port, the optical rotator 186 rotates the polarization orientation of only one of two beams so that the beams subsequently comprise mutually orthogonal polarization orientations and such that these two beams are subsequently combined upon passage through the birefringent walk-off plate 184. The reciprocal optical rotator 186 may be disposed so as to intercept either the o-ray 188 or the e-ray 190.

It is evident from FIG. 2 that the polarizing port 116 emanates two similarly polarized beams and also receives two similarly polarized beams. It is therefore to be kept in mind that each optical pathway or path segment illustrated in FIGS. 1A–1B or in FIGS. 3–6 actually comprises two similarly polarized parallel beams. The two beams are not separately visible within FIGS. 1A–1B or in FIGS. 3–9 because one beam is disposed "behind" another (or behind the plane of the drawing) in the side-views shown in these figures. Stated another way, the two parallel beams project onto the same path segments in these side views. The two parallel beams would, however, be visible in top views (not shown).

From the above discussion of the operation of the interleaved MUX/DEMUX 100 and the interleaved MUX/DEMUX 150, it may be noted that the set of odd channels $\lambda_1$, $\lambda_3$, $\lambda_5$, . . . and the set of even channels $\lambda_2$, $\lambda_4$, $\lambda_6$, . . . each encounters two reflection interferometers. The odd channels interact with the first reflection interferometer 110 and then with the third reflection interferometer 114 whereas the even channels interact with the first reflection interferometer 110 and then with the second reflection interferometer 112. Because of these dual interactions, each of the interleaved MUX/DEMUX 100 and the interleaved MUX/DEMUX 150 comprises combined channel separation and comb filtering functionality. Stated more explicitly, any channels that may be misdirected after interaction with the first reflection interferometer 110 are further filtered by interaction with another reflection interferometer so as to be prevented from entering the incorrect one of the two non-common ports 116b–116c.

Figure 3:
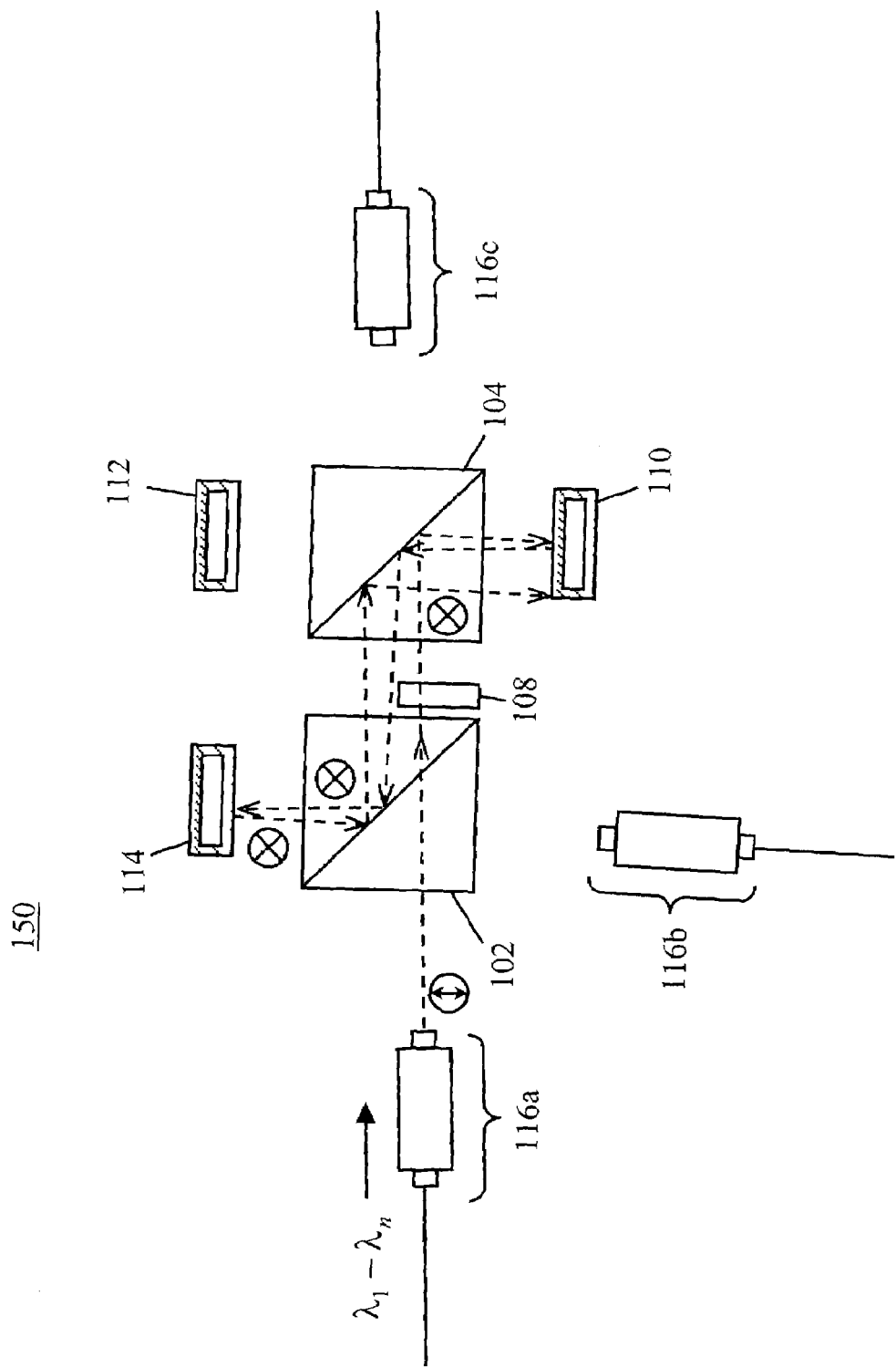
FIG. 3 is an illustration of pathways through the apparatus of FIG. 1B of light of even channels inadvertently reflected by the second PBS.
Figure 4:
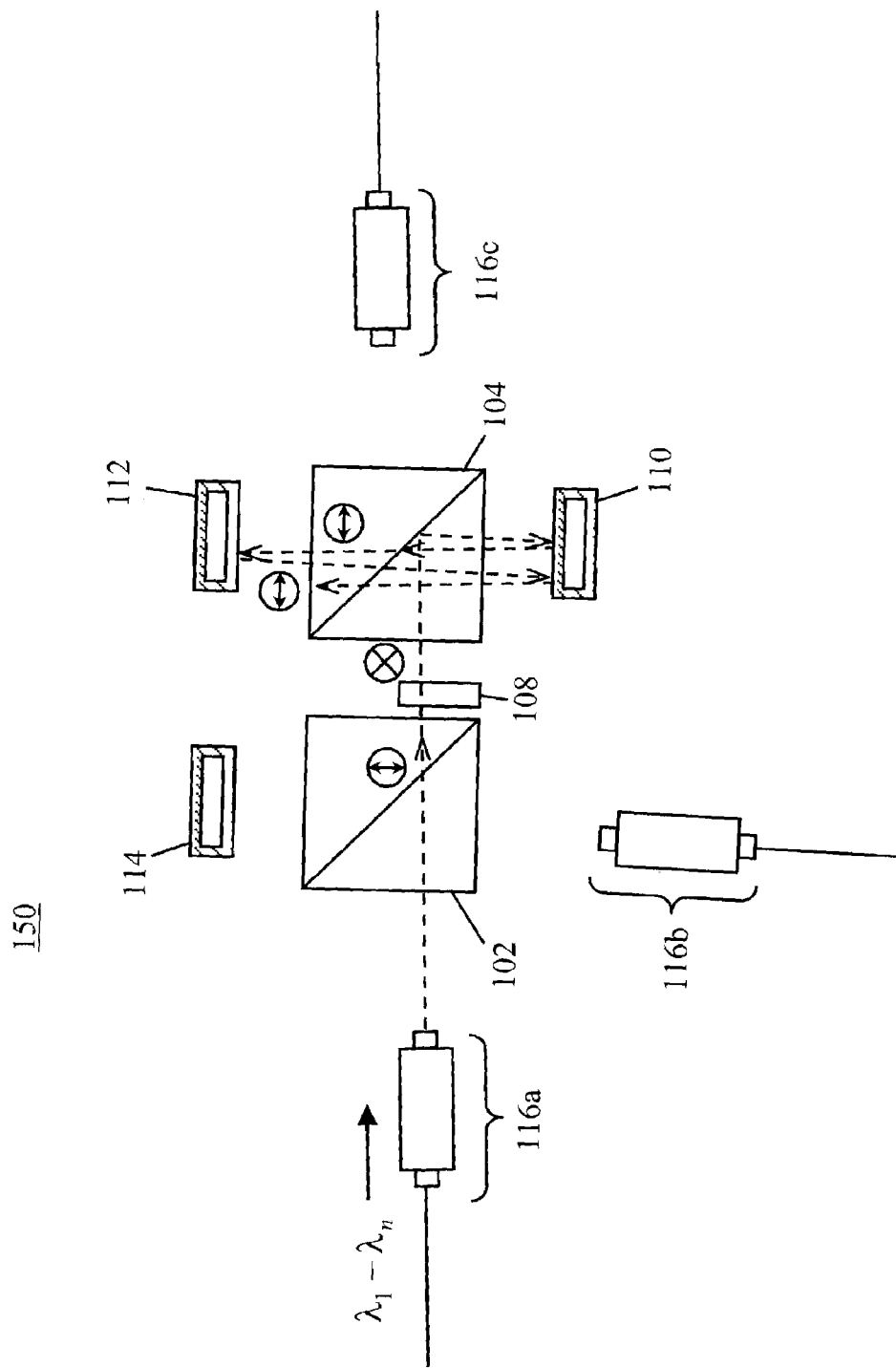
FIG. 4 is an illustration of pathways through the apparatus of FIG. 1B of light of odd channels inadvertently transmitted through the second PBS.

FIGS. 3–4 illustrate the effects of the combined channel separation and comb filtering properties of the MUX/DEMUX 100 and the interleaved MUX/DEMUX 150. The effect is only demonstrated for the apparatus 150 in FIGS. 3–4. Nominally, after reflection from the first reflection interferometer 110, all light comprising the odd channels $\lambda_1$, $\lambda_3$, $\lambda_5$, . . . is s-polarized and reflected from the second PBS 104 and all light comprising the even channels $\lambda_2$, $\lambda_3$, $\lambda_6$, . . . is p-polarized and transmitted through the second PBS 104. However, as a result of possible imperfect operation of the first reflection interferometer 110, some of the light of even channels reflected therefrom may be inadvertently s-polarized and some of the light of odd channels reflected therefrom may be inadvertently p-polarized. The interactions with the second and third reflection interferometers 112, 114 ensure that neither the inadvertently s-polarized even-channel light nor the inadvertently p-polarized odd channel light is directed to one of the ports.

FIG. 3 is an illustration of pathways through the interleaved MUX/DEMUX 150 of light of misdirected even channels. Because they are inadvertently s-polarized after interaction with the first reflection interferometer 10, these even channels are reflected from the second PBS 104 towards the first PBS 102 along an incorrect pathway that coincides with the (correct) pathway of the odd channels.

Because they are s-polarized, the misdirected even channels are then reflected or deflected by the first PBS 102 to the third reflection interferometer 114. As mentioned previously, the third reflection interferometer 114 is configured such that, upon interaction with and reflection therefrom, the polarization of linearly polarized light comprising the even channels is not changed. Therefore, the misdirected even channels remain s-polarized with respect to the first PBS 102 and are reflected or deflected therefrom once again towards the second PBS 104. The pathway of these misdirected channels is such that they do not pass through the half-wave plate 108 as shown in FIG. 3. Therefore, the light of these misdirected even channels remains s-polarized with respect to the second PBS 104 and is reflected or deflected thereat so as to exit the apparatus away from any of the ports.

FIG. 4 is an illustration of pathways through the MUX/DEMUX 150 of light of misdirected odd channels. Because they are inadvertently p-polarized with respect to the second PBS 104, these misdirected odd channels are transmitted through the second PBS 104 along an incorrect pathway that coincides with the (correct) pathway of the even channels. The misdirected odd channels are thus transmitted through the second PBS 104 to the second reflection interferometer 112. The second reflection interferometer 112 is configured such that, upon interaction with and reflection therefrom, the polarization of linearly polarized light comprising the odd channels is not changed. Therefore, the misdirected odd channels remain p-polarized with respect to the second PBS 104 and are transmitted therethrough once again. As shown in FIG. 4, the misdirected odd channels either exit the apparatus immediately after passing through the second PBS 104 or else are reflected by the first reflection interferometer 110 such that they exit the apparatus. The misdirected odd channels are thus not directed towards any of the ports.

Figure 5:
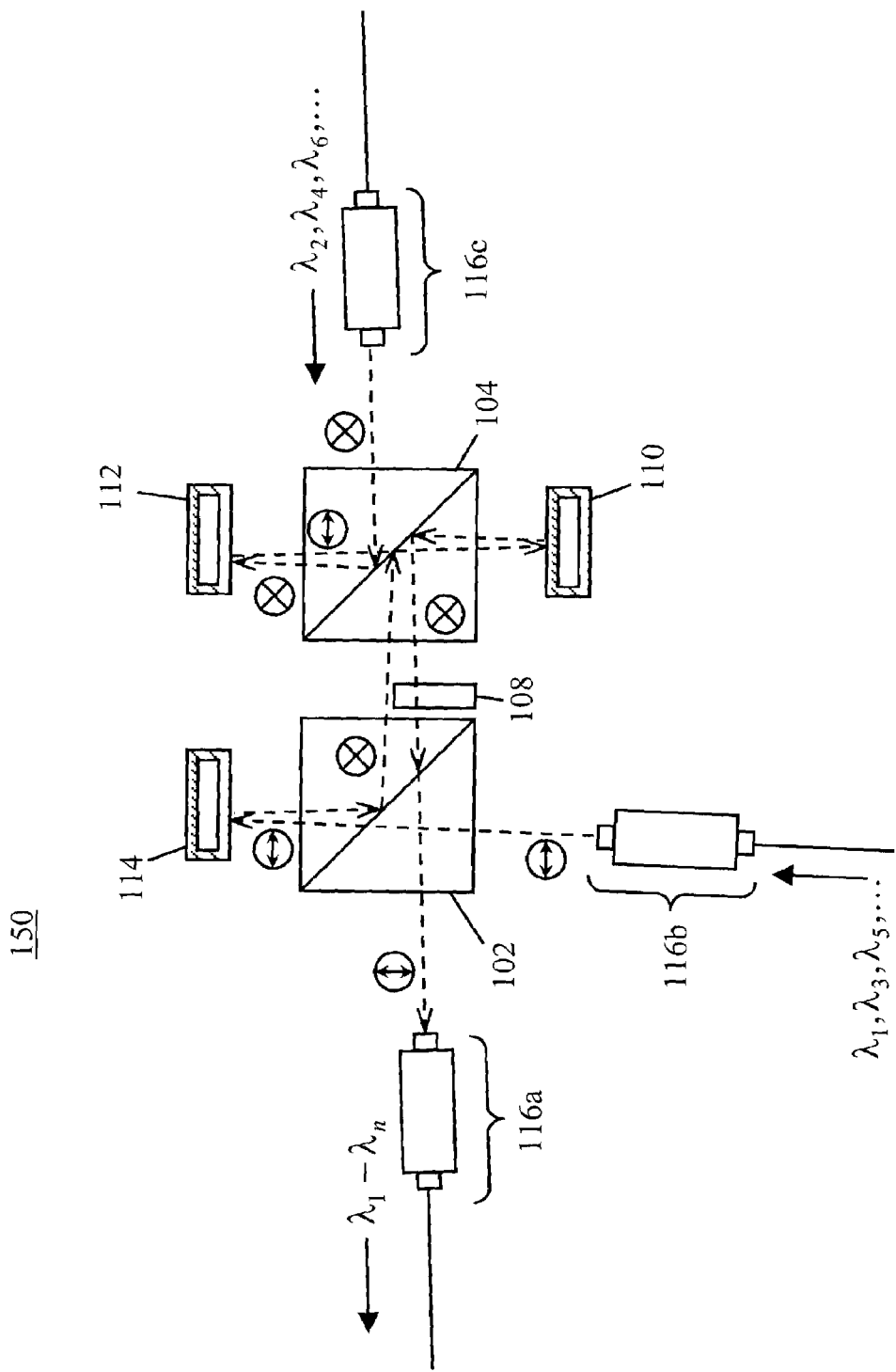
FIG. 5 is a side view of the apparatus of FIG. 1B showing the pathways of odd signal channels therethrough from the first non-common port to the common port and of even channels therethrough from the second non-common port to the common port.

FIG. 5 is a side view of the apparatus 150 of FIG. 1B showing the pathways of channels therethrough when the apparatus is operated as a MUX. The operation of the apparatus 100 as a MUX is similar to that shown in FIG. 5 and, therefore, not explicitly illustrated. In the MUX mode of operation, odd channels are input to the apparatus 150 from the first non-common port 116b and even channels are input to the apparatus from the second non-common port 116c. Both of the ports 116b-116c are polarizing ports of the type illustrated in FIG. 2 and, therefore, light entering the apparatus via either of these ports is linearly polarized. The first non-common port 116b is configured such that light emanating therefrom enters the first PBS 102 and is p-polarized with respect to that PBS. The second non-common port 116c is configured such that light emanating therefrom enters the second PBS 104 and is s-polarized with respect to that PBS. Because of these polarization characteristics, odd channels input to the apparatus 150 from the port 116b and even channels input to the apparatus 150 from the port 116c follow pathways that are exactly reversed from those pertaining to the de-multiplexer operation of the apparatus 150. By comparing FIG. 5 with FIG. 1B, it may be readily observed that the odd and even channels all follow pathways so as to all be output at the common port 116a.

Figure 6:
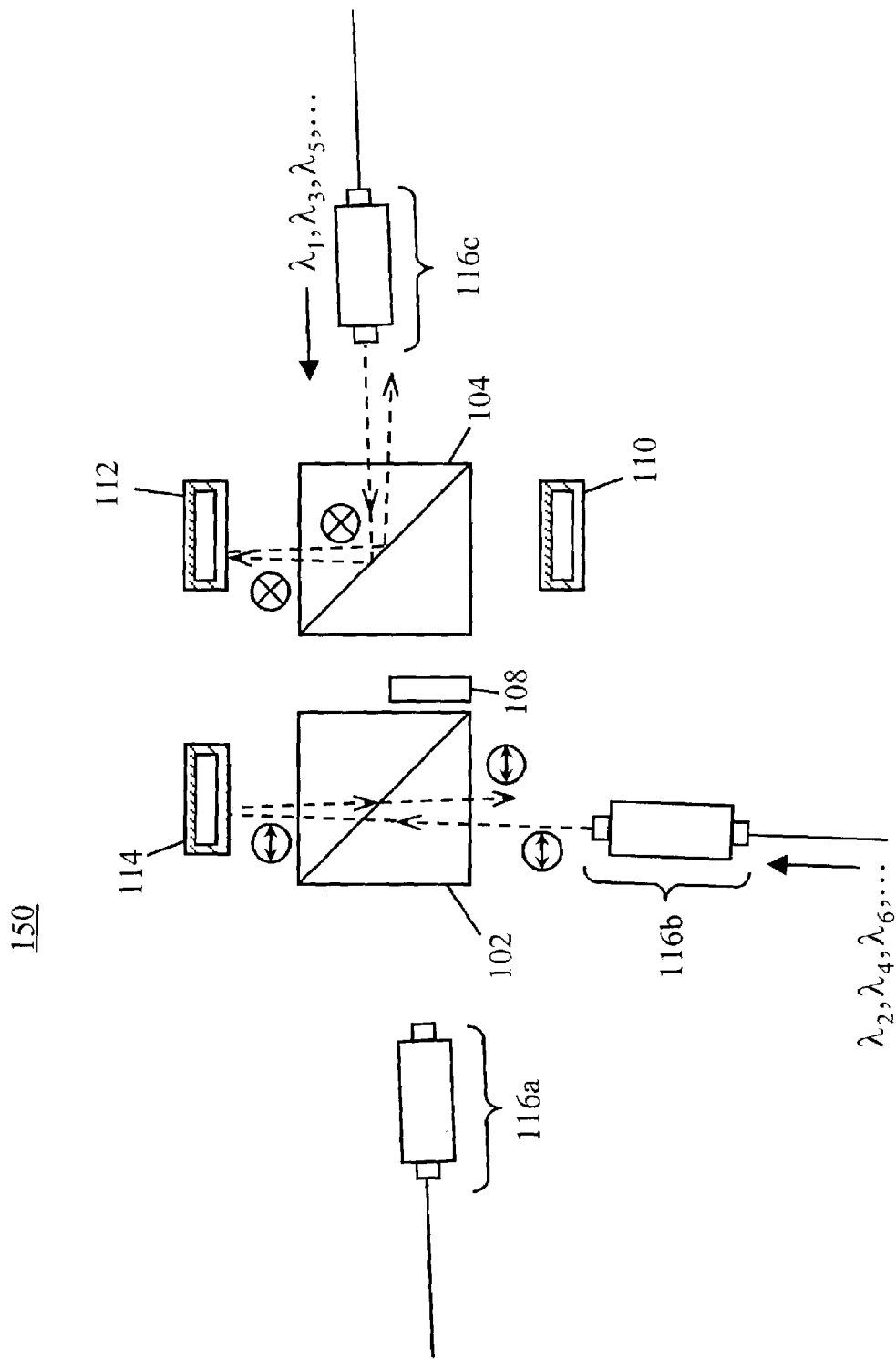
FIG. 6 is a side view of the apparatus of FIG. 1B showing the pathways therethrough of odd signal channels inadvertently input from the second non-common port and of even channel signals inadvertently input from the first non-common port.

FIG. 6 is a side view of the apparatus 150 of FIG. 1B showing the pathways therethrough of even channel signals inadvertently input from the port 116b and of odd signal channels inadvertently input from the port 116c. The pathways of such inadvertently input channels through the apparatus 100 are similar to those shown in FIG. 6. Because both of the ports 116b–116c are polarizing ports of the type illustrated in FIG. 2, light emanating from the port 116b enters the first PBS 102 as p-polarized light and light emanating from the port 116c enters the second PBS 104 as s-polarized light. The p-polarized light of the inadvertently input even channels passes undeflected through the first PBS 102 to the third reflection interferometer 114 and the s-polarized light of the inadvertently input odd channels is reflected or deflected by the second PBS 104 to the second reflection interferometer 112. Neither the polarization of the inadvertently input even channels nor the polarization of the inadvertently input odd channels is rotated upon interaction with and reflection from the third reflection interferometer 114 and the second reflection interferometer 112, respectively. Therefore, the inadvertently input even channels and the inadvertently input odd channels follow return pathways through the first PBS 102 and the second PBS 104 that cause the light to exit the apparatus 150 without encountering any of the ports.

Figure 7:
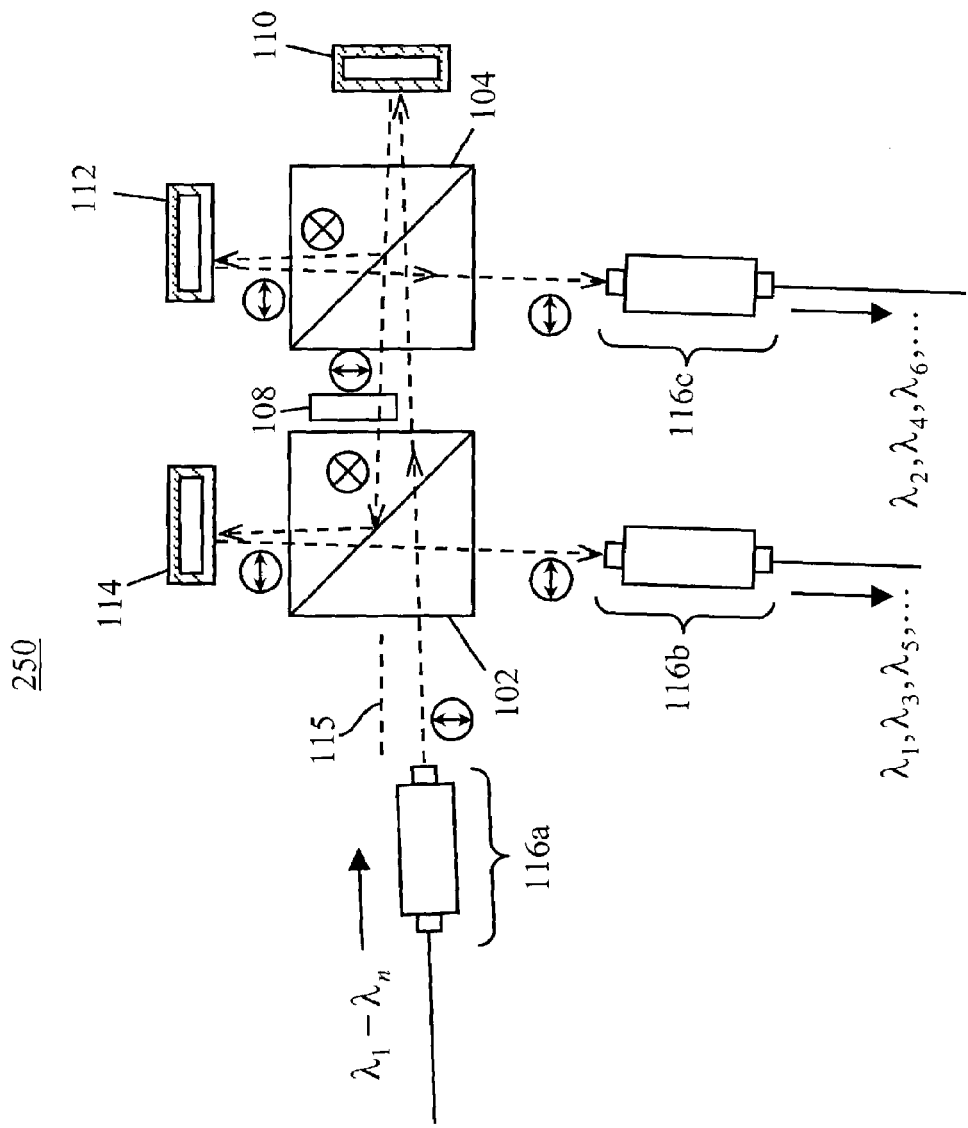
FIG. 7 is a side view of a third preferred embodiment of an interleaved MUX/DEMUX in accordance with the present invention showing the pathways of odd signal channels therethrough from the common port to the first non-common port and of even channels therethrough from the common port to the second non-common port.

FIG. 7 is a side view of a third preferred embodiment of an interleaved MUX/DEMUX in accordance with the present invention. The interleaved MUX/DEMUX 250 shown in FIG. 7 is similar to the MUX/DEMUX 150 shown in FIG. 1B except that: (a) the half-wave plate 108 is shifted into a different position between the PBS's 102–104 and (b) the positions of the first reflection interferometer 110 and the second non-common port 116c are interchanged with one another.

Since the light emanating from the common port 116a within the MUX/DEMUX 250 does not intercept the half-wave plate 108 on its traverse from the first PBS 102 to the second PBS 104, this light remains p-polarized with respect to both these PBS's 102–104 and proceeds undeflected through both PBS's so as to arrive at the first reflection interferometer 110. After interaction with and reflection from the first reflection interferometer 110, the light of the odd channels, whose polarization is not rotated, remains p-polarized and proceeds through the second PBS 104 and the half-wave plate 108 to the first PBS 102. The half-wave plate 108 rotates the polarization of this odd-channel light by 90° so that it becomes s-polarized with respect to the first PBS 102. Afterwards, the pathway and polarization state of the set of odd channels is similar to that shown in FIGS. 1A–1B.

The light of the even channels, whose polarization is rotated 90° by the first reflection interferometer 110 within the MUX/DEMUX 250, becomes s-polarized and is reflected by the second PBS 104 to the second reflection interferometer 112. The second reflection interferometer 112 once again rotates the polarization of the light of the even channels so that, after reflection from the second reflection interferometer 112, this light is p-polarized with respect to the second PBS 104. This p-polarized light of the even channels then proceeds undeflected through the second PBS 104 to the port 116c.

Figure 8:
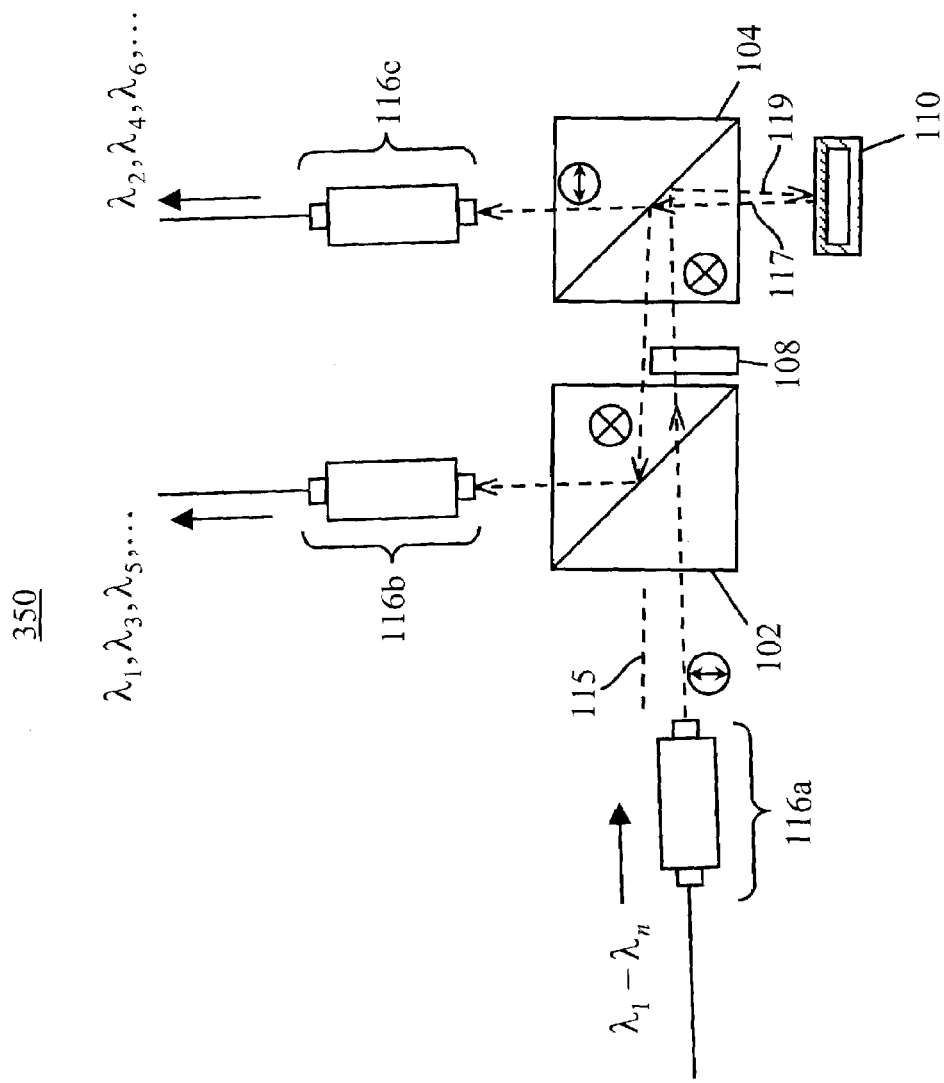
FIG. 8 is a side view of a fourth preferred embodiment of an interleaved MUX/DEMUX in accordance with the present invention showing the pathways of odd signal channels therethrough from the common port to the first non-common port and of even channels therethrough from the common port to the second non-common port.

FIG. 8 is a side view of a fourth preferred embodiment of an interleaved MUX/DEMUX in accordance with the present invention. The interleaved MUX/DEMUX 350 shown in FIG. 8 is similar to the MUX/DEMUX 150 shown in FIG. 1B except that the second reflective interferometer 112 and the third reflective interferometer 114 are eliminated and are replaced by the ports 116c and 116b, respectively. The MUX/DEMUX 350 (FIG. 8) therefore does not comprise the functionality of an optical comb filter described previously.

Figure 9:
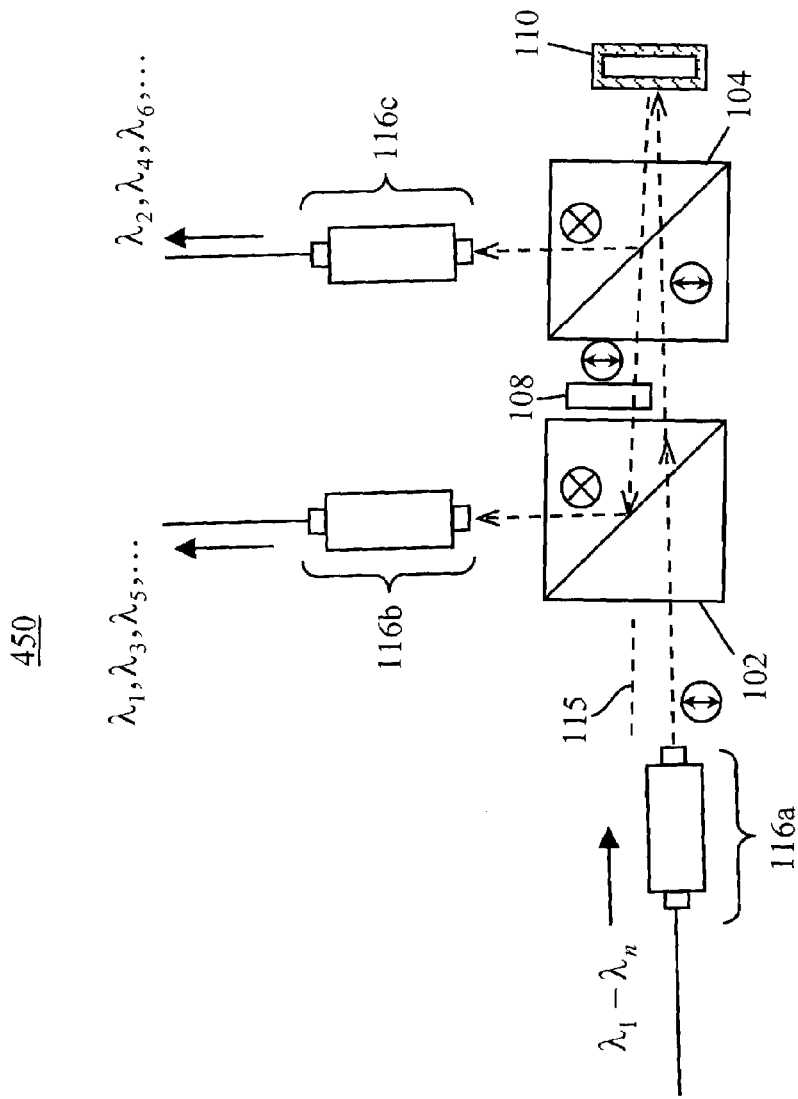
FIG. 9 is a side view of a fifth preferred embodiment of an interleaved MUX/DEMUX in accordance with the present invention showing the pathways of odd signal channels therethrough from the common port to the first non-common port and of even channels therethrough from the common port to the second non-common port.

FIG. 9 is a side view of a fifth preferred embodiment of an interleaved MUX/DEMUX in accordance with the present invention. The interleaved MUX/DEMUX 450 shown in FIG. 9 is similar to the interleaved MUX/DEMUX 350 shown in FIG. 8 except that: (a) the half-wave plate 108 is shifted into a different position between the PBS's 102–104 and (b) the first reflection interferometer 110 is moved into a position upon the axis 115 extended. Therefore, the MUX/DEMUX 450 (FIG. 9) does not comprise the functionality an optical comb filter. The pathways of the odd channels to the first non-common port 116b and of the even channels to the second non-common port 116c may be traced through either the apparatus 350 or the apparatus 450 by consideration of the principles previously discussed herein.

An apparatus capable of functioning as either an interleaved wavelength division de-multiplexer or multiplexer has been disclosed. In an exemplary embodiment, an apparatus in accordance with the present invention comprises a common port, two non-common ports, a first, second and third reflection interferometer, a pair of polarization beam splitters (PBS's), and a half-wave plate, wherein the half-wave plate is partially optically coupled between the two PBS's, the common port is optically coupled to the first PBS, the first and second non-common ports are optically coupled, respectively, to the first and second PBS's, the first and second reflection interferometers are optically coupled to the second PBS and the third reflection interferometer is optically coupled to the first PBS. Each of the polarizing input and polarizing output ports comprises an optical fiber, a collimator, a birefringent walk-off plate and a non-reciprocal optical rotator.

Although the present invention has been disclosed in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical apparatus functioning either as a multiplexer or a demultiplexer, comprising:
    a first polarization beam splitter (PBS);
    a second PBS optically coupled to the first PBS along an axis of the apparatus;
    a half-wave plate partially optically coupled between the first and second PBS;
    a common optical port optically coupled to the first PBS at a face intersecting the axis;
    a first non-common optical port optically coupled to the first PBS at a face not intersecting the axis;
    a second non-common optical port optically coupled to the second PBS; and
    a reflection interferometer optically coupled to the second PBS, wherein the reflection interferometer is configured to rotate a polarization of one set of channels relative to another set of channels.

2. The apparatus of claim 1, wherein the second non-common optical port is optically coupled to the second PBS at a side not intersecting the axis; and
    wherein the reflection interferometer is optically coupled to the second PBS at a side opposite to the second non-common optical port.

3. The apparatus of claim 1, wherein the second non-common optical port is optically coupled to the second PBS at a side not intersecting the axis; and
    wherein the reflection interferometer is optically coupled to the second PBS at a side opposite to the half-wave plate.

4. The apparatus of claim 1, further comprising:
    a second reflection interferometer optically coupled to the second PBS at a face not intersecting the axis; and
    a third reflection interferometer optically coupled to the first PBS at a side opposite to the first non-common optical port.

5. The apparatus of claim 4, wherein the second non-common optical port is optically coupled to the second PBS at a side opposite to the half-wave plate; and
    wherein the reflection interferometer is optically coupled to the second PBS at a side opposite to the second reflection interferometer.

6. The apparatus of claim 4, wherein the second non-common optical port is optically coupled to the second PBS at a side opposite to the second reflection interferometer; and
    wherein the reflection interferometer is optically coupled to the second PBS at a side opposite to the half-wave plate.

7. The apparatus of claim 1, wherein the reflection interferometer is tilted such that paths of optical channels traversing along the axis are at an angle to the axis.

8. The apparatus of claim 4, wherein the second reflection interferometer or the third reflection interferometer is tilted such that paths of optical channels traversing along the axis are at an angle to the axis.

9. The apparatus of claim 1, wherein the common optical port, the first non-common optical port, or the second non-common optical port is tilted such that paths of optical channels traversing along the axis are at an angle to the axis.

10. The apparatus of claim 1, wherein the common optical port, the first non-common optical port, or the second non-common optical port comprises:
    an optical fiber;
    an optical collimator optically coupled to the optical fiber;
    a birefringent walk-off optically coupled to the optical collimator and the optical fiber; and
    a reciprocal optical rotator optically coupled to the birefringent walk-off plate at a side opposite to the optical collimator.

11. An optical apparatus functioning either as a multiplexer or a demultiplexer, comprising:
    a first polarization beam splitter (PBS);
    a second PBS optically coupled to the first PBS along an axis of the apparatus;
    a half-wave plate partially optically coupled between the first and second PBS;
    a common optical port optically coupled to the first PBS at a face intersecting the axis;
    a first non-common optical port optically coupled to the first PBS at a face not intersecting the axis;
    a second non-common optical port optically coupled to the second PBS at a side not intersecting the axis; and
    a reflection interferometer optically coupled to the second PBS at a side opposite to the second non-common optical port, wherein the reflection interferometer is configured to rotate a polarization of one set of channels relative to another set of channels.

12. The apparatus of claim 11, wherein the reflection interferometer is tilted such that paths of optical channels traversing along the axis are at an angle to the axis.

13. The apparatus of claim 11, wherein the common optical port, the first non-common optical port, or the second non-common optical port is tilted such that paths of optical channels traversing along the axis are at an angle to the axis.

14. An optical apparatus functioning either as a multiplexer or a demultiplexer, comprising:
- a first polarization beam splitter (PBS);
- a second PBS optically coupled to the first PBS along an axis of the apparatus;
- a half-wave plate partially optically coupled between the first and second PBS;
- a common optical port optically coupled to the first PBS at a face intersecting the axis;
- a first non-common optical port optically coupled to the first PBS at a face not intersecting the axis;
- a second non-common optical port optically coupled to the second PBS at a side not intersecting the axis; and
- a reflection interferometer optically coupled to the second PBS at a side opposite to the half-wave plate, wherein the reflection interferometer is configured to rotate a polarization of one set of channels relative to another set of channels.

15. The apparatus of claim 14, wherein the reflection interferometer is tilted such that paths of optical channels traversing along the axis are at an angle to the axis.

16. The apparatus of claim 14, wherein the common optical port, the first non-common optical port, or the second non-common optical port is tilted such that paths of optical channels traversing along the axis are at an angle to the axis.

17. An optical apparatus functioning either as a multiplexer or a demultiplexer, comprising:
- a first polarization beam splitter PBS;
- a second PBS optically coupled to the first PBS along an axis of the apparatus;
- a half-wave plate partially optically coupled between the first and second PBS;
- a common optical port optically coupled to the first PBS at a face intersecting the axis;
- a first non-common optical port optically coupled to the first PBS at a face not intersecting the axis;
- a second non-common optical port optically coupled to the second PBS at a side opposite to the half-wave plate;
- a first reflection interferometer optically coupled to the second PBS at a face not intersecting the axis;
- a second reflection interferometer optically coupled to the second PBS at a side opposite to the first reflection interferometer, and
- a third reflection interferometer optically coupled to the first PBS at a side opposite to the first non-common optical port, wherein the reflection interferometers are each confirmed to rotate a polarization of one set of channels relative to another set of channels.

18. The apparatus of claim 17, wherein at least one of the first, second, or third reflection interferometers is tilted such that paths of optical channels traversing along the axis are at an angle to the axis.

19. The apparatus of claim 17, wherein at least one of the common optical port, the first non-common optical port, or the second non-common optical port is tilted such that paths of optical channels traversing along the axis are at an angle to the axis.

20. An optical apparatus functioning either as a multiplexer or a demultiplexer, comprising:
- a first polarization beam splitter (PBS);
- a second PBS optically coupled to the first PBS along an axis of the apparatus;
- a half-wave plate partially optically coupled between the first and second PBS;
- a common optical port optically coupled to the first PBS at a face intersecting the axis;
- a first non-common optical port optically coupled to the first PBS at a face not intersecting the axis;
- a second non-common optical port optically coupled to the second PBS at a face not intersecting the axis;
- a first reflection interferometer optically coupled to the second PBS at a side opposite to the half-wave plate;
- a second reflection interferometer optically coupled to the second PBS at a side opposite to the second non-common optical port; and
- a third reflection interferometer optically coupled to the first PBS at a side opposite to the first non-common optical port, wherein the reflection interferometers are each configured to rotate a polarization of one set of channels relative to another set of channels.

21. The apparatus of claim 20, wherein at least one of the first, second, or third reflection interferometers is tilted such that paths of optical channels traversing along the axis are at an angle to the axis.

22. The apparatus of claim 20, wherein at least one of the common optical port, the first non-common optical port, or the second non-common optical port is tilted such that paths of optical channels traversing along the axis are at an angle to the axis.

* * * * *